Jan. 19, 1937.   C. W. ROBINSON   2,068,387
DISTRIBUTOR FOR GRAIN DRILLS
Filed Oct. 14, 1935
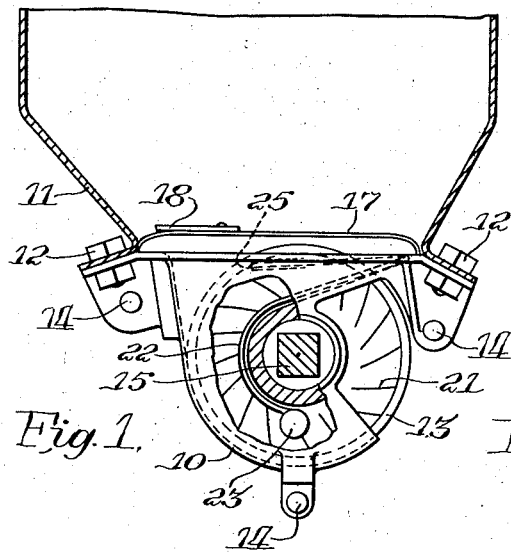
Fig. 1.
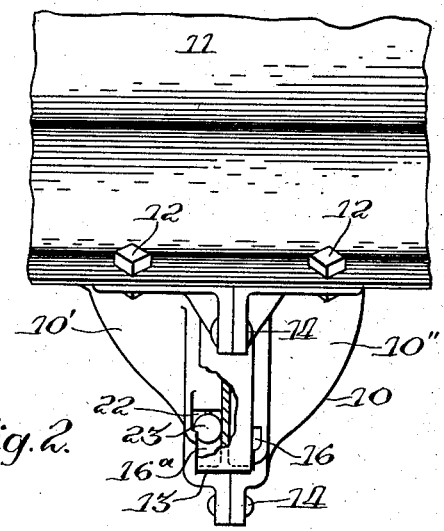
Fig. 2.
Fig. 3.
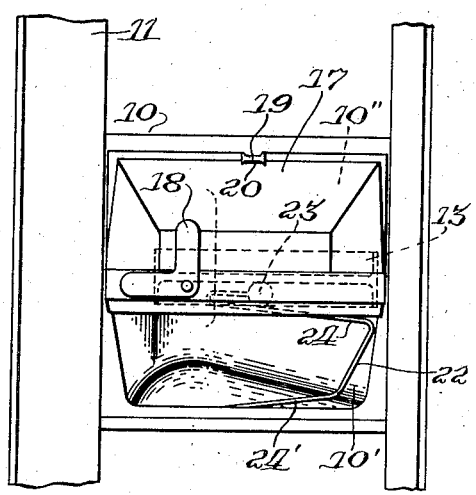
Fig. 4.
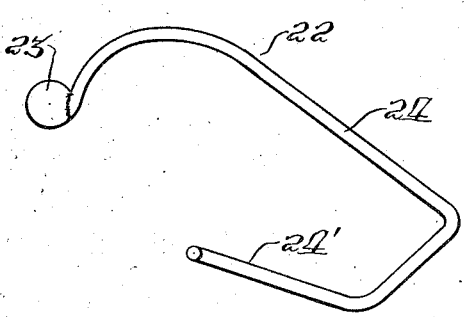
Inventor
Charles W. Robinson
By
Atty.

Patented Jan. 19, 1937

2,068,387

UNITED STATES PATENT OFFICE 2,068,387

DISTRIBUTOR FOR GRAIN DRILLS

Charles W. Robinson, Auburn, N. Y., assignor to International Harvester Company, a corporation of New Jersey Application October 14, 1935, Serial No. 44,909

6 Claims. (Cl. 221—140)

This invention relates to improvements in grain drill feeding devices, often called distributors.

It relates more particularly to a force feed device and is of the type known as flange feeds or double-run.

The main object of the invention is to provide a reducer for limiting the flow of feed from the distributing wheel.

Another more specific object of the invention is to provide a ball type of reducer which is resiliently mounted in the distributing device.

Still another object is to provide a removable reducer for the distributing device.

In accomplishing the foregoing objects and other minor objects, which will hereinafter be more specifically described and then defined in the claims, the preferred forms and the improved details of structure are illustrated in the accompanying drawing, wherein:

Figure 1 is a side elevation through a grain drill hopper, showing the grain distributor with the ball reducer in place;

Figure 2 is a rear elevation showing the ball reducer in place;

Figure 3 is a plan elevation showing the distributor feed cup; and,

Figure 4 is a perspective view of the ball reducer.

It will be understood that in a grain drill or other machine to which my distributor is to be attached the hopper of the machine is supported by the carrying wheels and the force required to move the wheels of the feeding device is transmitted through gearing from carrying wheels to seed feeding wheels. It is usual to employ a series of distributors for each machine, and it is usual to have what has been called the "double-run feeder", and by this is meant a distributor having two flanges and channels for the same, which flanges and channels are formed differently, so that each is adapted to sow a different variety of grain. One flange and channel is usually formed for small, hard, and smooth grains, such as wheat, rye, hemp or flax seed, while the other flange and channel is formed for oats, barley, buck wheat, maize and seeds of the coarser or chaffy variety.

One great difficulty often encountered in distributors of this class is that oats, barley and seeds of the coarser or chaffy variety, when sowed from the large feed channel, frequently are sowed too thickly and it has been found necessary to provide a reducer to cut down the flow. In addition, the above seeds tend to form bridges above what is known as the measuring point, thereby retarding the gradual and necessary even flow of the grain to said measuring point. My improved device is designed to prevent this, as will be more fully explained.

In accomplishing these objects, it is especially desirable to have a flange feeding device which will positively and accurately feed the grain which passes within the measuring channel of the distributor. By the construction shown and to be described, I improve the accuracy and efficiency of this flange feeding device. In the specific embodiment of the invention herein disclosed, the feed cup 10 is secured to a distributing hopper 11, as shown in Figure 1, being removably secured thereto by the bolts and nuts 12. The feed cup 10 is of the double-run type having the wheel 13 surrounded by the feed cup 10 which is comprised of two casings 10' and 10" secured together by rivets 14, forming a unitary feed cup 10. The distributing wheel 13 is driven from the square shaft 15 located on the horizontal axis of the feed wheel, and the shaft is connected by suitable gearing to the ground wheels which support the hopper 11 in the usual manner. The feed cup 10 is divided into two separate distributing cups for different sizes of grains. The smaller grains are distributed through the opening 16 and the larger grains are distributed through the opening 16ª. The top of the feed cup 10 is provided with two openings, one only being used, depending upon whether the small or large grains are being sown.

As shown in Figure 3, a cover 17 encloses the portion of the feed cup used for small grain and is locked in place by the bell crank latch 18 which is pivoted at the center of the feed cup 10. When it is desired to use the small seed cup side of the main feed cup, the cover 17 may be removed by releasing the latch 18 and placing the cover 17 over the discharge opening from the main distributing hopper into the feed cup for the large seed. The cover 17 is further latched in place by the lugs 19 and the notch 20.

In order to provide an even flow of seed from the large opening 16ª of the feed cup through which the large or chaffy grains are sown, it has been found necessary to provide a resiliently mounted reducer. The function of this reducer is to limit the flow of seeds to the large opening 16ª and to provide a more uniform flow of seed and to also break up any bridges of seed formed between the outside casing of the feed cup and the serrations 21 on the vertical face of the feed wheel 13. This reducer 22, as best shown in Figure 4, comprises a ball-shaped portion 23 welded to a resilient member 24, so bent as to conform to the inner shape of the measuring channel of the large feed cup portion 10'. As best shown in Figures 1, 3 and 4, the spring member 24, to which the ball 23 is attached at its lower end, curves about the inner lower wall portion of the casing 10' upwardly to the rear where there is a laterally extending portion, as best shown in Figure 3, and then a forwardly extending portion 24', which engages a notch or securing means 25 forming a latch means on the inner side of the casing 10', thus locking the ball reducer in place. It is thus seen that this ball reducer 22 may be readily removed when the full capacity of the large measuring channel with the opening 16ª is desired.

It will be evident that there has been provided a ball reducer for the large measuring channel of a double-run feed cup which may be readily connected or disconnected from the feed cup. Furthermore, the ball member 23 forms an efficient reducing member and tends to break up any bridges that may be formed in the measuring channel by the large seed through its resilient mounting as the serrations engage the ball 23 as the feed wheel 13 is rotated.

It is also evident that this type of ball reducer attachment may be readily applied to a feed cup of this type and is very cheap to manufacture.

The preferred embodiment of the invention herein disclosed is capable of certain modifications without departure from the scope of the invention to be defined in the following claims.

What is claimed is:

1. The combination with a feeding device having a feed-wheel revolving therein forming a plurality of discharge channels, of a reducing means for one of said discharge channels to regulate the flow therefrom, said reducing means being ball-shaped, and means for resiliently mounting said ball-shaped reducing means in the feeding device, said resilient means being rigidly secured to the aforesaid ball-shaped reducing means.

2. A seed distributor provided with a feed-wheel revolving therein, a reducing means arranged within said distributor to regulate the discharge of seed therefrom at the outlet thereof, said reducing means being ball-shaped, and means for resiliently mounting said ball-shaped reducing means in the seed distributor, said resilient means being rigidly secured to the aforesaid ball-shaped reducing means.

3. A reducing attachment for a seed-cup comprising a removable reducing means having a resilient member adapted to fit the inner lower wall of the cup and project at its reducing end a suitable distance into the outlet throat, a ball-shaped member thereon, and resilient means for securing the reducing means in position within the seed-cup.

4. A reducing attachment for a seed-cup comprising a removable reducing means having a resilient member adapted to fit the inner wall of the cup and project at its reducing end a suitable distance into the outlet throat, a ball-shaped member thereon, a lateral projection on the upper end of said resilient member conforming to the inner wall of the cup, and a downwardly projecting member substantially in alignment with the aforesaid resilient member and a continuation thereof for securing the reducing attachment within the seed-cup.

5. The combination with a feeding device for fluent material having a feed-wheel revolving therein forming a discharge channel below the horizontal axis of the feed wheel and serrations on the vertical face of said wheel for distributing said fluent material, of a reducing means for said discharge channel to regulate the flow therefrom, said reducing means mounted below the horizontal axis of the feed wheel and contacting said serrated wheel adjacent the discharge channel, and means for resiliently mounting said reducing means in the feeding device whereby, as said serrated wheel is revolved, the reducing means will be agitated to prevent bridging of said fluent material in said discharge channel.

6. The combination with a feeding device for fluent material having a feed-wheel revolving therein, of a reducing means for said discharge channel to regulate the flow therefrom, resilient supporting means for resiliently mounting said reducing means in the feeding device, and securing means on said feeding device for engaging said resilient supporting means whereby said reducing means will be latched in place within said feeding device.

CHARLES W. ROBINSON.